(12) United States Patent
Gorman et al.

(10) Patent No.: US 6,957,821 B2
(45) Date of Patent: Oct. 25, 2005

(54) SAFETY DEVICE FOR MOTORCYCLE FOOT PEGS

(76) Inventors: Mark Gorman, 195 Wooster St., Unit 2, New Haven, CT (US) 06511; William Bizer, 30701 Glenmuer, Farmington Hills, MI (US) 48334

( * ) Notice: Subject to any disclaimer, the term of this patent is extended or adjusted under 35 U.S.C. 154(b) by 0 days.

(21) Appl. No.: 10/346,600

(22) Filed: Jan. 17, 2003

(65) Prior Publication Data

US 2004/0140646 A1    Jul. 22, 2004

(51) Int. Cl.$^7$ ............................................... B62J 25/00
(52) U.S. Cl. ....................................... 280/291; 74/564
(58) Field of Search ............................. 280/201, 304.3, 280/304.4; 74/564; D12/114; 296/75

(56) References Cited

U.S. PATENT DOCUMENTS

| | | | |
|---|---|---|---|
| 4,456,090 A | * 6/1984 | Malenotti | 180/219 |
| 4,458,910 A | * 7/1984 | Stillwagon | 280/291 |
| 5,354,086 A | * 10/1994 | Mueller | 280/291 |
| 5,779,254 A | * 7/1998 | James et al. | 280/291 |
| 5,979,269 A | * 11/1999 | Su-Chen | 74/564 |
| 6,152,474 A | * 11/2000 | Rupert | 280/291 |
| 6,173,983 B1 | * 1/2001 | Moore | 280/291 |
| 6,578,652 B1 | * 6/2003 | Kobacker et al. | 180/219 |

* cited by examiner

Primary Examiner—Avraham Lerner
(74) Attorney, Agent, or Firm—Kohn & Associates, PLLC

(57) ABSTRACT

An adjustable safety mechanism for a motorcycle foot peg, the device including a support mechanism for providing additional support for a foot a mounter for mounting the support mechanism on and spaced from the foot peg, an adjusting mechanism for adjusting the support mechanism relative to the foot peg, the adjusting mechanism extending between the support mechanism and the mounter. A method of retrofitting a safety device on a motorcycle foot peg by mounting the safety device on an attached motorcycle foot peg utilizing a universal bracket.

5 Claims, 5 Drawing Sheets

SAFETY DEVICE FOR MOTORCYCLE FOOT PEGS

TECHNOLOGICAL FIELD OF THE INVENTION

The present invention generally relates to safety devices for motorcycles. More specifically, the present invention relates to a foot-retaining device for a motorcycle foot peg.

DESCRIPTION OF RELATED ART

In the past, passengers on two-wheeled vehicles such as motorcycles generally placed their feet on portions of the vehicle frame for support while driving on a roadway. In some instances, foot supports for passengers have been pivotally incorporated into the frame behind the seat of the driver at approximately axle level. Although such incorporations have been successful in providing support for the driver's feet, nothing is provided for guiding the passenger's feet onto the support and there is a lack of retention of the foot itself. The passenger is left with a feeling of instability.

Several attempts to provide additional passenger foot support have included a boot-type retainer that has been proven to be unsafe in the event the passenger should fall or desire to rapidly put his or her feet on the ground such as at a stop sign. Under such circumstances, the passenger has difficulty extracting his or her feet from the boot-type retainer in a rapid and natural manner.

A long-standing need exists to provide aftermarket foot guides and retainers on the frame of a motorcycle or other two-wheeled vehicle that will readily guide and support the feet of a passenger during travel on the vehicle. The support and guide must be capable of allowing the passenger to safely and readily remove or dislodge the passenger's feet in an emergency situation.

Individuals have attempted to overcome the problems disclosed above by providing foot guides for the passenger's feet that are added to the motorcycle. These foot guides are very elaborate and must be fitted to the motorcycle. A fundamental problem with these foot guides is that they require pedals to be affixed to the motorcycle that are cumbersome and can be intrusive on the machinery of the motorcycle. Additionally, the intricate nature of applying these foot guides to the motorcycle makes them more cumbersome and less likely to be useful for motorcycle passengers.

It would therefore be useful to develop a safety device for passenger foot pegs that is retrofittable to the motorcycle and can be affixed with minimal effort.

SUMMARY OF THE INVENTION

According to the present invention, there is provided an adjustable safety device for a motorcycle foot peg, the device including a support device for providing additional support for a foot, a mounting mechanism for mounting the support device on and spaced from the foot peg, an adjusting mechanism for adjusting the support device relative to the foot peg, the adjusting mechanism extending between the support device and the mounter. Also provided is a method of retrofitting a safety device on a motorcycle foot peg by mounting the safety device on an attached motorcycle foot peg utilizing a universal mount.

BRIEF DESCRIPTION OF THE DRAWINGS

Other advantages of the present invention are readily appreciated as the invention becomes better understood by reference to the following detailed description when considered in connection with the accompanying drawings, wherein.

DETAILED DESCRIPTION OF THE INVENTION

Figure 1:
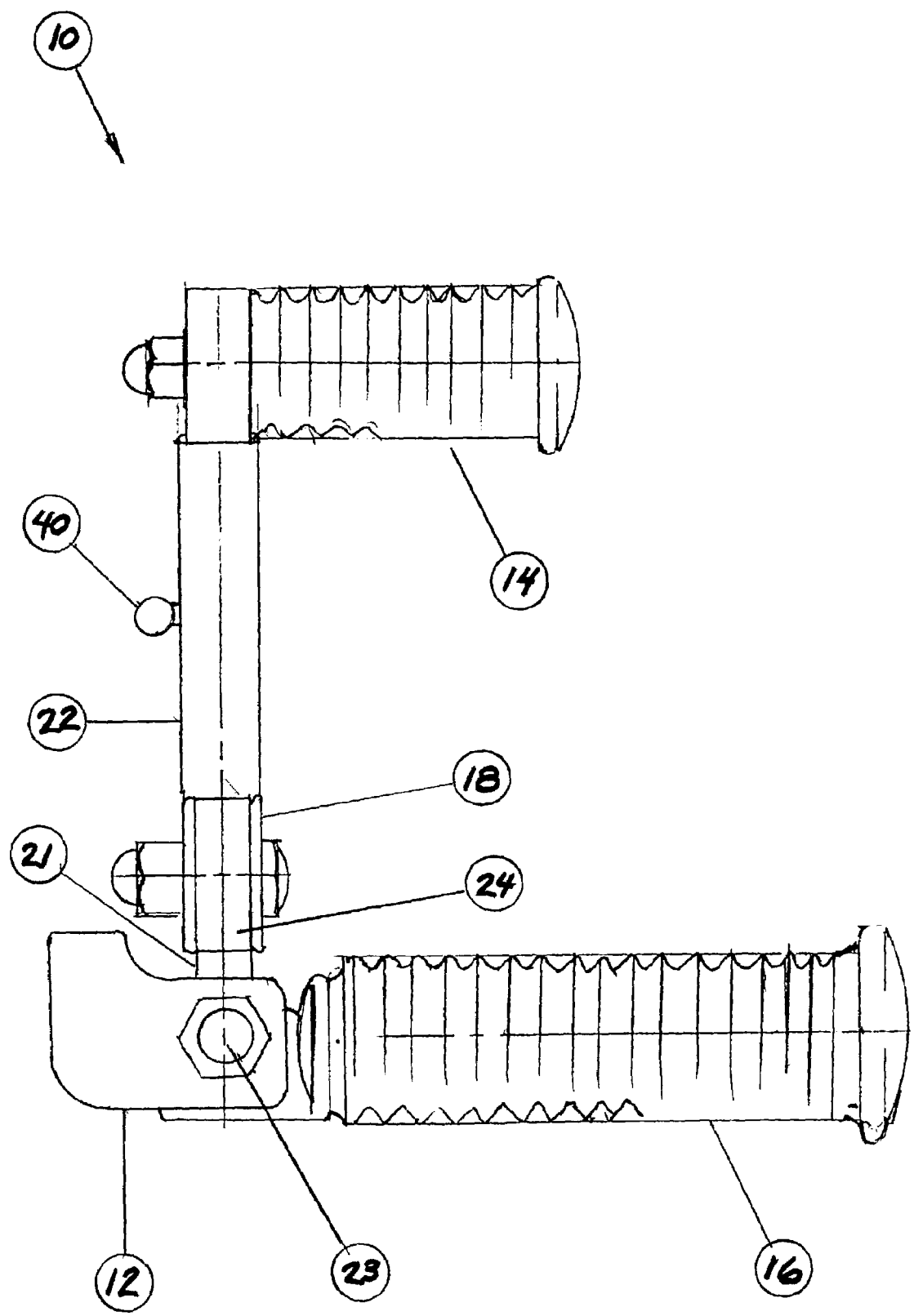
FIG. 1 is a front view of the safety device of the present invention.
Figure 2:
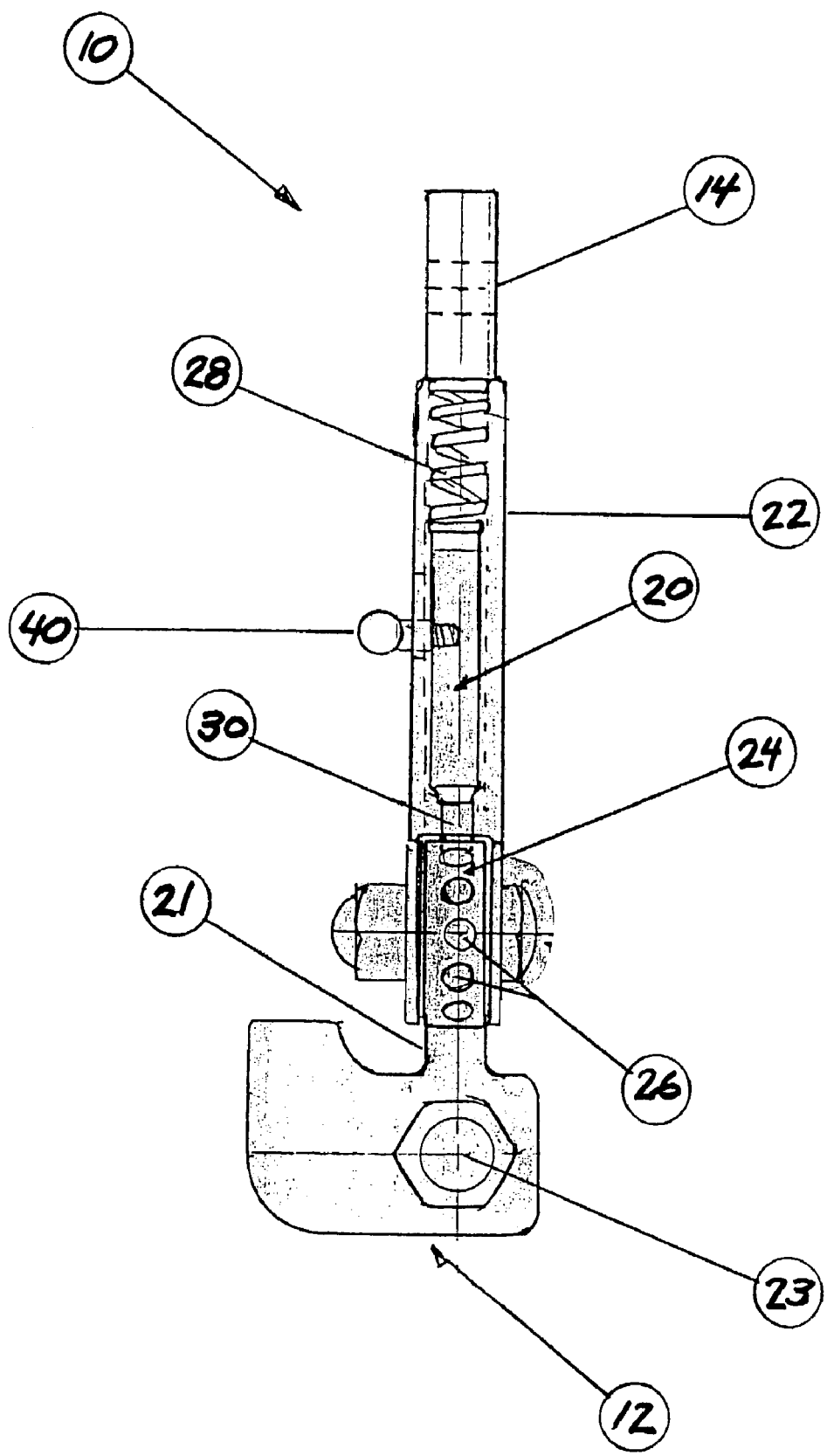
FIG. 2 is a cross-sectional view of the safety device of the present invention.

The present invention provides an adjustable safety device, generally shown at 10 in the attached figures. The safety device 10 is for use on a motorcycle foot peg 16. The device 10 includes a support mechanism generally indicated at 14, a mounting mechanism 12 for mounting the support mechanism 14 on and spaced from the foot peg 16, and an adjusting mechanism 18 for adjusting the support mechanism 14. relative to the foot peg 16. The adjusting mechanism 18 extends between the support mechanism 14 and the mounting mechanism 12. The safety device 10 also provides the passenger with a hands-free feeling of support while riding on a motorcycle.

The term "foot peg" as used herein is intended to include a conventional foot peg 16 normally found as part of a motorcycle. The foot peg 16 can be of any size and attached by various means to any motorcycle. For example, the foot peg 16 can be the passenger foot peg 16 on the rear portion of the motorcycle, or alternatively the foot peg 16 can be the foot peg 16 of the driver. The present invention can function with any size foot peg 16 on any make or model of motorcycle. The safety device 10 of the present invention can also be applied to motorcycles with floorboards, using a bracket capable of being affixed to the floorboards. Alternatively, the safety device 10 can be made detachable from the foot peg 16 or frame mount. The detachment process can be accomplished by a quick release mechanism, thus making it possible to remove the device instantly with a release pin trigger similar to the trigger present on the existing part. In other words, the safety device 10 can be removed and stowed either on the motorcycle, on the person, or in a saddle bag, while the adjusting mechanism 18 remains attached to the mounting mechanism 12.

The term "support mechanism" as used herein is intended to indicate the support mechanism: 14 as shown in the attached figures. The support mechanism 14 is a device that can create a platform to abut with a foot and is spaced from the foot peg 16 and can be adjusted to move relative thereto. The support mechanism 14 can be anything that can perform this function, such as a foot peg or shifter peg already manufactured for a motorcycle. Further, the support mechanism 14 can be flat, round, longer, or shorter than the described foot pegs. The support mechanism 14 can be a shifter peg of the same make and model as the motorcycle to which the support mechanism 14 is being attached. Alternatively, the support mechanism 14 can be any support mechanism 14 that can be affixed to the motorcycle. The size of the support mechanism 14 does not have to be identical to that of the shifter peg, but instead can be larger or smaller depending on the preference of the passenger and the location at which it is being fitted. Alternatively, the support mechanism 14 can be made by another maker than that of the motorcycle to which the support mechanism 14 is being affixed.

The mounting mechanism 12 is capable of fixedly attaching the safety device 10 to the motorcycle. The mounting mechanism 12 is preferably a universal bracket that only requires a single bolt 23 to be reversibly affixed to the motorcycle. The bolt 23 is preferably affixed through the foot peg 16 as shown in FIG. 1. The mount 12 can be of any configuration such that it enables the safety device 10 to be retrofitted to the motorcycle without requiring the foot peg 16 to be removed from the motorcycle. In other words, the entire safety device 10 can be retrofitted utilizing a single bolt 23 without requiring any part currently on the motorcycle to be removed in order for the safety device 10 to be affixed. Alternatively, the safety device 10 can include a foot peg 16 in combination with the safety device 10 disclosed herein, for use in replacing an existing foot peg.

In the preferred embodiment, the universal mount 12 is C-shaped such that it covers the foot peg 16 but does not limit the movement of the foot peg 16. The mount 12 includes an inner surface 17 that directly contacts the foot peg 16 via a pivot point of the foot peg. Such movement of the foot peg 16 can include, but is not limited to, pivoting the foot peg 16 so that it is not extended from the motorcycle when not required for use such that the foot peg 16 is flush with the motorcycle.

Figure 3:
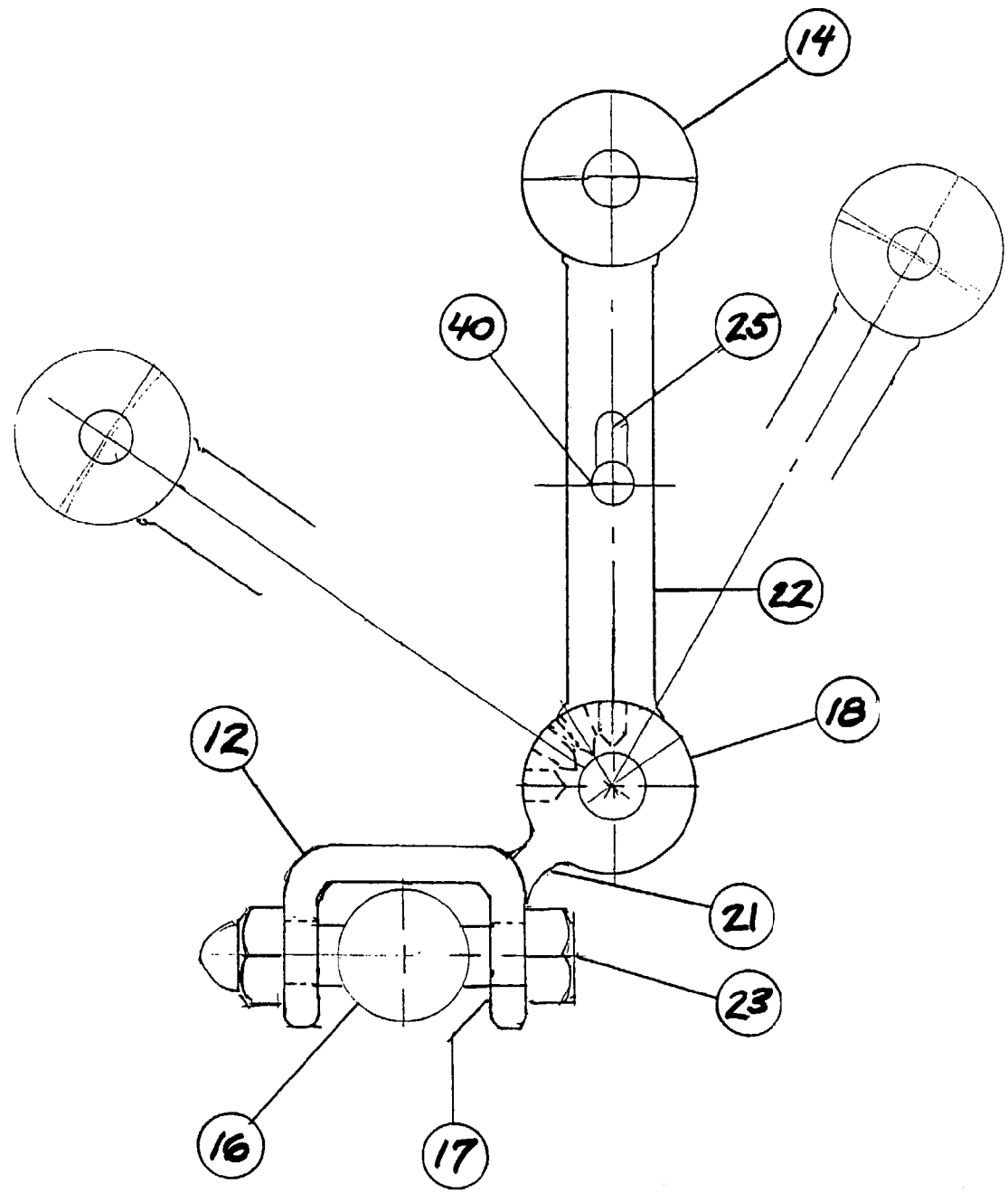
FIG. 3 is a side view of the safety device of the present invention showing the full range of motion of the safety device.
Figure 4:
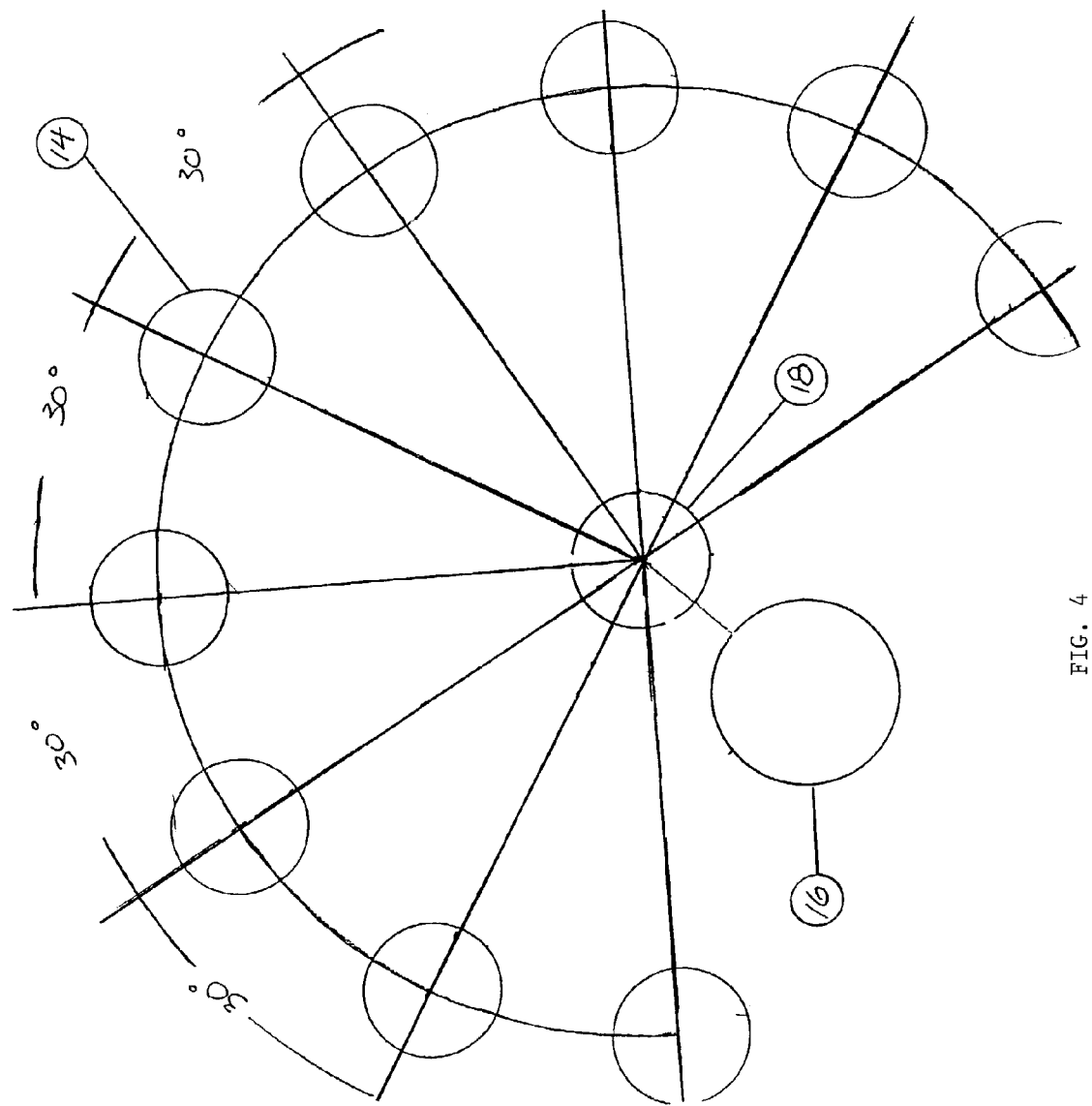
FIG. 4 is a drawing depicting one embodiment of the present invention wherein there are numerous adjusting positions located 30° apart.

The adjusting mechanism 18 of the present invention is a pivotable arm that includes at least two locking positions such that the adjusting mechanism 18 enables the peg 14 to be moved relative to the foot peg 16 as shown in FIGS. 3 and 4. The adjusting mechanism 18 is fixedly attached to the mounting mechanism 12. Preferably, this is accomplished either via welding the adjusting mechanism 18 to the mounting mechanism 12 or configuring the entire device to be formed as a single unit.

The adjusting mechanism 18 functions as shown in FIGS. 3 and 4. More specifically, the adjusting mechanism 18 enables the support mechanism 14 to move in any variety of locations. For example, FIG. 4 shows nine different locations for the support mechanism 14 to be located. The adjusting mechanism 18 allows the support mechanism 14 to be swung into its location and then affixed at that location. More specifically, the adjusting mechanism 18 includes a pivoting mechanism 31 for perfecting movement between the support mechanism 14 and the mounting mechanism, 12.

The safety device 10 of the present invention includes a support mechanism 14 that is affixed to an adjustment mechanism 18 via a pin tube 22. The support mechanism 14 is maintained in place via a locking pin 20 that is spring-loaded within the pin tube 22. Pin sprocket 24 is located within the adjusting mechanism 18. The pin sprocket 24 is designed to include multiple apertures 26 that engage the spring-loaded pin 20. The spring 28 for the spring-loading is located at the top of the pin tube 22, e.g., the end closest to the support mechanism 14. The locking pin 20 includes an end 30 that is of a size sufficient to engage an aperture 26 in the sprocket 24 of the adjusting mechanism 18. The locking pin 20 also includes a release pin 40 for moving the locking pin 20 into and out of engagement. The release pin 40 resides in a pin tube 22. The channel 25 holds the locking pin 20 in proper alignment. When the locking pin 20 is slid within the channel 25, the pin 20 causes the spring 28 to be compressed thereby withdrawing the end 30 from the aperture 26. This movement enables the support mechanism 14 to be adjusted to a desired position. When the spring-loaded pin 20 is released, the end 30 is engaged in an aperture 26 of the pin sprocket 24, thereby locking the support mechanism 14 in place.

The adjusting mechanism 18 is fixedly attached to the mounting mechanism 12 and is preferably bolted onto the foot peg 16.

Figure 5:
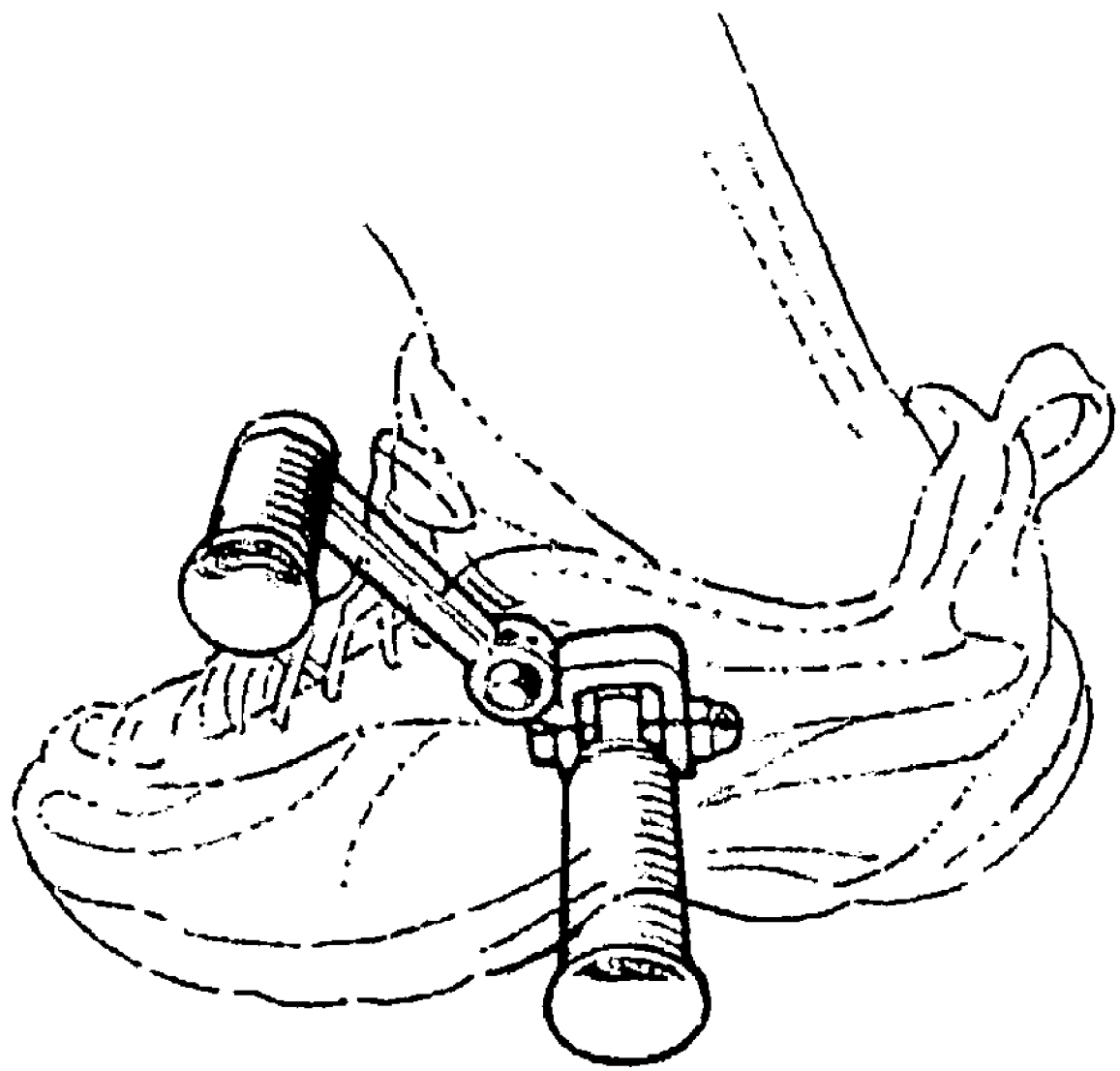
FIG. 5 is a drawing depicting the safety device of the present invention with a foot located within the device.

The safety device 10 can function in a number of ways. For example, as shown in FIG. 5, a foot 13 can be placed between the support mechanism 14 and the foot peg 16. Alternatively, the support mechanism 14 can be moved forward or backward to provide more rigid control of the foot movement. The support mechanism 14 can be placed at its farthest most forward or backward position thereby creating a flat surface on which a foot 13 can rest.

Additionally, the support mechanism 14 can be pivotable in a similar manner as the foot peg 16, as shown in FIGS. 3 and 4. In other words, the support mechanism 14 can be moved into and out of engagement such that when the support mechanism 14 is out of engagement, the support mechanism 14 is flush with the motorcycle and not extended outward from the chassis of the motorcycle. The pivot motion occurs in an arc relative to the foot peg 16. In other words, the pivot motion occurs around the foot peg 16 thereby moving the support mechanism 14 relative to the foot peg 16, thus allowing for the foot, ankle, and calf to be placed at various angles relative to one another depending upon where the foot peg 16 is located on the motorcycle.

The safety device 10 of the present invention is also reversible. The safety device 10 can be placed on either the right side or the left side of a motorcycle. It is this reversibility that enables any number of configurations as are necessary to be formed utilizing the safety device 10.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. An adjustable safety device for a motorcycle foot peg, said device comprising:

a foot peg;

support means for providing additional support for a foot placed on said foot peg;

mounting means for mounting said support means on, and spaced from, said foot peg; and fixed adjusting means extending between said support means and said mounting means for adjusting the relative position of said support means to the foot peg once said device is mounted on said foot peg said fixed adjusting means comprising pivoting means for rotatably pivoting said fixed adjusting means between numerous positions within said pivoting means and spring-loaded locking means for engaging said pivoting means and maintaining said fixed adjusting means at a set position in said pivoting means.

2. An adjustable safety device according to claim 1, wherein said support means includes a peg member mounted on said mounting means.

3. An adjustable safety device according to claim 1, wherein said mounting means includes an arm portion operatively connected to a bracket member, said bracket member including attachment means for reversible attachment to the foot peg.

4. An adjustable safety device according to claim 1, wherein said mounting means is a retrofittable bracket that is affixed to the foot peg.

5. An adjustable safety device according to claim 4, wherein said means includes pivoting means interconnecting said arm portion to said attachment for allowing pivoting movement between said arm portion and said attachment means, said pivoting means including locking means for locking said arm in a position relative to said attachment means.

* * * * *